United States Patent Office 2,715,130
Patented Aug. 9, 1955

2,715,130

2(5'-HYDROXY-4'-OXO-2'-γ-PYRANYLMETHYL)-2-THIO-3- (LOWER ALKENYL) PSEUDOUREAS

Carl Peter Krimmel, Mundelein, Ill., assignor to G. D. Searle & Co., Chicago, Ill., a corporation of Illinois No Drawing. Application February 17, 1954, Serial No. 411,011

3 Claims. (Cl. 260—345.9)

My present invention relates to a new group of thiopseudourea derivatives, their salts and methods for their preparation. More particularly, it relates to the 2-thiopseudoureas substituted at the sulfur atom by a 5-hydroxy-4-oxo-2-γ-pyranylmethyl radical and at the amino nitrogen atom by a lower alkenyl radical. The basic compounds can be represented as the 2-(5'-hydroxy-4'-oxo-2'-γ-pyranylmethyl)-2-thio-3-(lower alkenyl)-pseudoureas of the general structural formula:

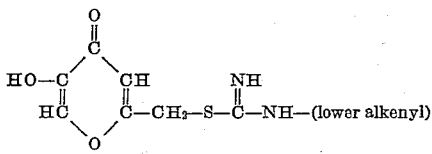

Among the 3-(lower alkenyl) radicals suitable for the purposes of my invention are such lower aliphatic hydrocarbon radicals containing an unsaturated linkage as vinyl, allyl, methallyl, crotyl, ethallyl, pentenyl, and hexenyl. These compounds form salts which are nontoxic in therapeutic dosage with a variety of inorganic and strong organic acids.

The thiopseudoureas of my invention are conveniently obtained as the hydrohalide salts by the condensation of a 5-hydroxy-2-halomethyl-4-pyrone with one equivalent of an N-(lower alkenyl)thiourea in an organic solvent such as a lower aliphatic alcohol. The free bases are liberated from the hydrohalides by treatment with alkaline reagents. The object of my invention is to provide novel thiopseudourea derivatives which possess valuable medicinal activities. Specifically, the compounds of my invention are potent antibacterial agents, active against gram-positive as well as gram-negative organisms. Further, they are cardiovascular agents producing a strong positive inotropic effect on the heart muscle. Unlike the lower 2 - (5' - hydroxy - 4' - oxo - 2' - γ - pyranylmethyl) - 2 - thio-3-alkylpseudoureas, these compounds do not interfere with mitosis in the common dosage range.

The examples below illustrate in further detail the compounds which constitute this invention and their synthesis but are in no way to be construed as limiting the invention in spirit or in scope. Quantities of materials are indicated in parts by weight.

EXAMPLE 1

2 - (5' - hydroxy - 4' - oxo - 2' - γ - pyranylmethyl) - 2-thio-3-allylpseudourea To a solution of 30 parts of N-allylthiourea in 16 parts of 95% ethanol are added 40 parts of 2-chloromethyl-5-hydroxy-4-pyrone. The reaction mixture is heated on a steam bath for 25 minutes after which it becomes a clear green solution. Anhydrous ether is added causing a green gum to precipitate. The ether is decanted and the gum is taken up in hot anhydrous isopropanol. Cooling and scratching induces the formation of a crystalline deposit which is suction-filtered, washed with cold isopropanol, and air-dried. A pale-yellow, water-soluble powder is obtained which gives a positive ferric chloride test. The hydrochloride of 2-(5'-hydroxy-4'-oxo-2'-γ-pyranylmethyl)-2-thio-3-allylpseudourea thus obtained melts with gas evolution to a brown liquid at about 148–151° C. The compound has the structural formula

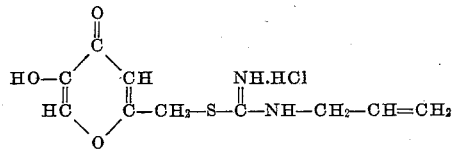

EXAMPLE 2

2 - (5' - hydroxy - 4' - oxo - 2' - γ - pyranylmethyl) - 2-thio-3-methallylpseudourea A mixture of 32 parts of 2-chloromethyl-5-hydroxy-4-pyrone, 27 parts of N-methallylthiourea and 130 parts of ethanol is heated on a steam bath for 30 minutes, cooled and triturated with anhydrous ether. The resulting precipitate is separated and taken up in hot anhydrous isopropanol. Refrigeration and scratching causes the formation of a crystalline precipitate which is collected on a filter, washed with cold isopropanol and dried. The hydrochloride of 2 - (5' - hydroxy - 4' - oxo - 2' - γ - pyranylmethyl)-2-thio - 3 - methallylpseudourea thus obtained has the structural formula

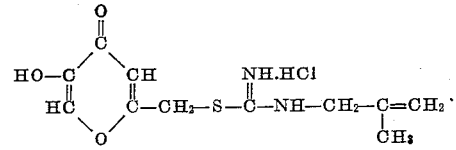

I claim:

1. A 2-(5'-hydroxy-4'-oxo-2'-γ-pyranylmethyl)-2-thio-3-(lower alkenyl)pseudourea of the structural formula

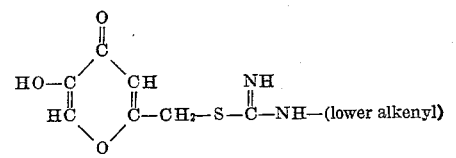

2. 2 - (5' - hydroxy - 4' - oxo - 2' - γ - pyranylmethyl) - 2-thio-3-allylpseudourea.

3. 2 - (5' - hydroxy - 4' - oxo - 2' - γ - pyranylmethyl) - 2-thio-3-methallylpseudourea.

References Cited in the file of this patent

UNITED STATES PATENTS 2,422,740    Morey _____ June 24, 1947